June 6, 1967   G. E. BROWN, JR   3,323,733
COAXIAL DISC AND CYLINDRICAL ROTOR REFINING APPARATUS
Filed Aug. 28, 1964   2 Sheets-Sheet 1

INVENTOR.
GEORGE E. BROWN, JR
BY
Kinney & Schenk
ATTORNEYS

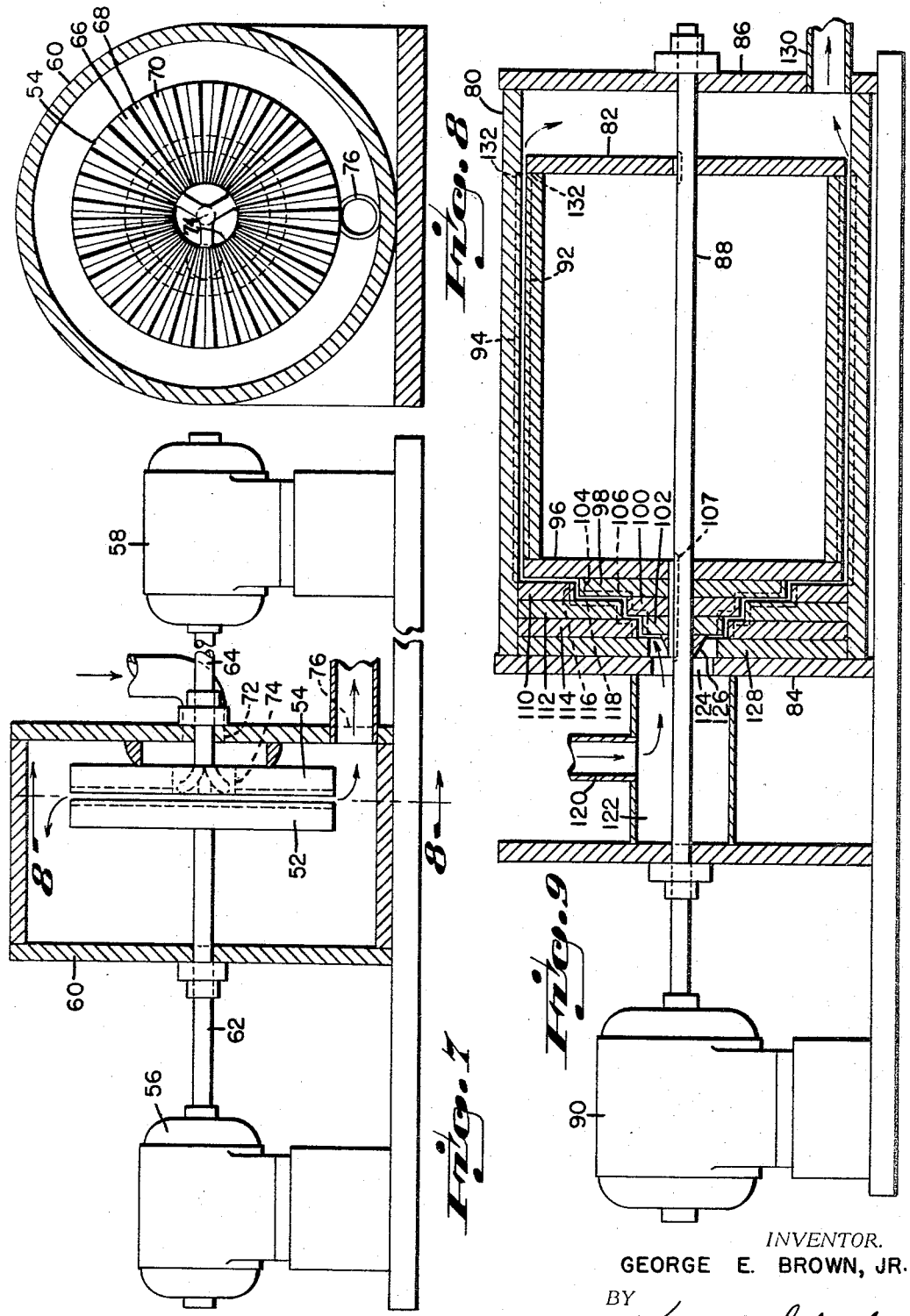

3,323,733
COAXIAL DISC AND CYLINDRICAL ROTOR REFINING APPARATUS

George E. Brown, Jr., Cincinnati, Ohio, assignor to Fibers Unlimited, Inc., Cincinnati, Ohio, a corporation of Ohio
Filed Aug. 28, 1964, Ser. No. 392,823
3 Claims. (Cl. 241—163)

The present invention relates to a refiner for the separation and reclamation of fiber from scrap paper and board stock that contains contaminants which are difficult to extract. As modern paper and board materials undergo various improvements to enhance the scope of their functional uses in industry, the scrap and waste become increasingly difficult to process for reclamation of fibers for re-use.

Exceedingly difficult of processing, are those papers and boards which are coated or impregnated with synthetic resins and various plastics, resin-clay coatings, and the like. Such stock when subjected to reduction in a conventional pulper, generally yields a limited amount of free fiber, and a considerable quantity of fiber clumps, small undefibered pieces and contaminants such as coating flecks, small pieces of plastic, small pieces of foil, and the like. The slurry from the pulper containing such materials requires further defibering and cleaning, and this is attempted usually in machines known as refiners. However, when the slurry contains contaminants such as pieces of foil, plastic or cellophane film, pieces of resin-clay coating material and the like, along with the fiber clumps and small undefibered pieces from wet strength paper, the conventional refiner will cut the contaminants into small shards which are almost impossible to later screen out. As a result, thorough defibering of clumps and small pieces of wet strength material is seriously depreciated, thereby greatly lowering the quality and the value of the processed material.

A primary object of the present invention is to enhance the quality and the quantity of fiber obtainable from the slurry discharged by a pulper of waste paper or board containing contaminants of the type mentioned above.

Another object of the invention is to provide a refining process that will thoroughly defiber the fiber clumps and undefibered pieces passed by the pulper, and at the same time reduce any resin-clay coating flecks to a size small enough to be washed out of the fiber, without undesirably cutting or comminuting the foil, cellophane, or plastic contaminants later to be removed.

A further object is to achieve the objectives above noted, without resort to expensive time-consuming procedures involving the use of chemicals and heat.

Another object is to provide an improved method and apparatus for simply and effectively reclaiming a maximum quantity of pure free fiber, from special-purpose paper or board scrap material which heretofore defied known defibering treatments.

The foregoing and other objects are attained by the means described herein and illustrated upon the accompanying drawings, in which:

FIG. 7 is a side elevational view, partly in cross-section, illustrating a modified form of the refiner.

FIG. 8 is a cross-sectional view taken on line 8—8 of FIG. 7.

FIG. 9 is a side elevational view, partly in cross-section, showing a third modification of the refiner.

Figure 1:
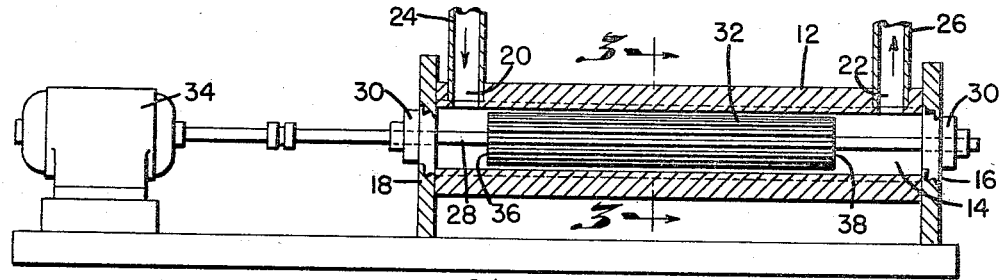
FIG. 1 is a side elevational view, partly broken away, illustrating the refiner of the present invention.
Figure 2:
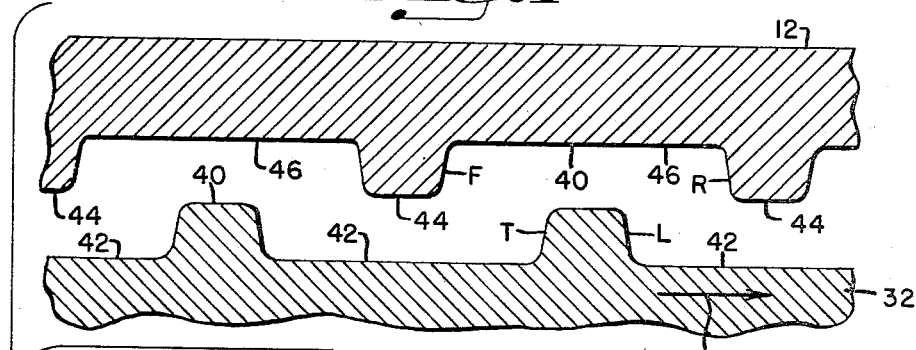
FIG. 2 is an enlarged fragmentary cross-sectional view illustrating details of a rotor and housing structure whereby is generated a working force of extremely high hydraulic shear and shock utilized in the treatment afforded by the refiner.
Figure 3:
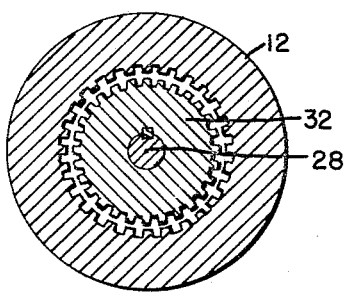
FIG. 3 is an enlarged cross-section taken on line 3—3 of FIG. 1.

In that form of the refiner illustrated by FIGS. 1, 2 and 3, the numeral 12 indicates a stationary hollow cylindrical housing, the inner elongate chamber 14 of which is closed at opposite ends by means of stationary heads 16 and 18 which form end walls. Near the opposite ends of the housing are provided an intake port 20, and an exhaust or delivery port 22. A duct or pipe 24 conveys slurry under pump pressure to port 20, while a second duct or pipe 26 conveys the slurry from housing 12 through port 22.

Upon a drive shaft 28 supported in bearings 30, is fixed a rotor 32 arranged to be driven at high speed concentrically within the housing, by means of an electric motor 34 or other drive means. The rotor may be in the form of a metallic cylinder having opposite ends 36 and 38, said ends being disposed near the intake and exhaust ports 20 and 22, respectively, and preferably between said ports as shown. The rotor may be a solid body keyed or otherwise fixedly secured upon shaft 28 axially thereof.

Rotor 32 may be fluted longitudinally in its outer cylindrical surface, to provide a series of alternate ribs 40 and channels 42 arranged preferably in substantial parallelism with the rotor axis. The ends of the channels may be open at the ends of the rotor, or if desired, the channel ends may be closed or partly closed to diminish flow of slurry lengthwise of the rotor, from port 20 to port 22.

In substantial correspondency with the rotor, the inner cylindrical surface of housing 12 is fluted longitudinally, to provide ribs 44 and channels 46 which lie in substantial parallelism with the ribs and channels of the rotor. Accordingly, as the rotor spins rapidly about its longitudinal axis, the ribs of the rotor pass those of the housing, or stator, to impose upon an intervening slurry an extreme and violent shear and shock. With reference to FIG. 2, it must be understood that rotor 32 moves rapidly in the direction of arrow 50, advancing the ribs 40 thereof past the ribs 44 of the stator or housing at a high rate of speed. The surface speed of the rotor, in order to generate the necessary shock and shear valuation, must be not less than one-hundred feet per second, and may desirably exceed that minimum, with the running clearance between the rotor and stator ribs gauged at .010 to .030 inch.

As the result of rotation of the rotor, pressure differential areas are created between the extending ribs of the moving rotor and those of the stator, to tumble the slurry with a circular motion each time a moving rib passes a stationary rib. To further explain, referring to FIG. 2, the leading face L of rotor rib 40 moves toward the rear face R of stator rib 44, creating a high pressure zone between said faces, to generate a high degree of shock and shear active upon any particles carried by the slurry, while at the same time the trailing face T of rib 40 in moving away from the forward face F of rib 44, creates a zone of low pressure between T and F. As the moving motor ribs pass consecutively the stationary ribs of the stator, these pressure differentials rapidly are created, causing the slurry between the rotor and the stator to circulate in substantial parallelism with the ribs and channels while at the same time the slurry is advanced lengthwise of the rotor by the action of the pump (not shown) which feeds slurry through intake port 20.

The extreme shock and shear occurring as above explained has proven highly effective to thoroughly defiber clumps and small undefibered pieces carried by the slurry, while at the same time reducing by impact any brittle or friable coating materials to such an extremely small particle size as to readily separate from the reclaimed fibers by screening. On the other hand, since the shock and shear generated by the moving rotor ribs is hydraulic rather than mechanical, contaminants of a non-brittle nature; such as metal foil, cellophane, or thermoplastic film, will pass through the refiner without size reduction, to facilitate their later removal by screening.

Figure 4:
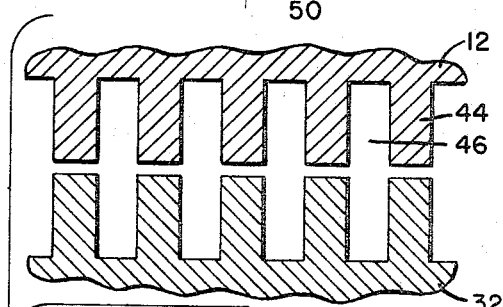
FIGS. 4, 5 and 6, are views similar to FIG. 2, illustrating three modifications of the rotor and housing construction.
Figure 5:
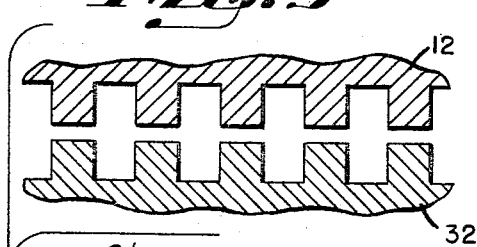
Figure 6:
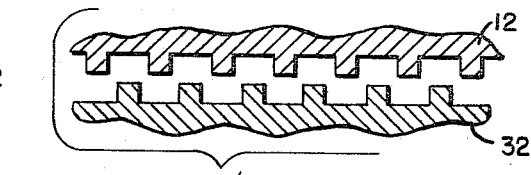

The cross-section of the ribs and channels in the rotor and stator surfaces have been found to have certain desirable limits as to width/depth ratio. For example, as shown in FIG. 4, the ribs 44 and channels 46 have a ratio of 1-unit width to 2-unit depth. In FIG. 6 is shown a ratio of 2-unit width to 1-unit depth. These constitute the approximate extremes of effective width/depth ratios. Intermediate ratios also are effective, such as the 1:1 ratio represented by FIG. 5. The 3:1 ratio as illustrated upon FIG. 2 is much less effective functionally, and would not ordinarily be selected in actual practice. FIG. 2, however, very clearly illustrates the principle of operation, and is adequate chiefly for purposes of explanation and clarity of disclosure.

FIGS. 7 and 8 illustrate a modification of the machine, wherein two rotors 52 and 54 are adapted to be rotated in opposite directions at high speed by means of separate electric motors 56 and 58. The rotors are enclosed within a housing 60, and are securely fixed upon the drive shafts 62 and 64 to rotate relatively in close proximity to one another.

Each rotor, as shown in FIG. 8, has a working face provided with alternate ribs 66 and channels 68 which radiate outwardly to the periphery 70 of each rotor. The ribs of one rotor are adapted to pass those of the other rotor with clearance, substantially as was explained in the description of FIGS. 1 to 6.

Slurry to be processed may be fed to the space between rotors 52 and 54, through a conduit or part 72 of housing 60, which port in turn delivers the slurry to a central aperture or distributor 74 provided in rotor 54. Rotation of the rotors centrifuges the slurry outwardly as shown by arrows above and beneath the rotors in FIG. 7, while the ribs and channels of the rotors perform to defiber clumps and undefibered pieces carried in the slurry. Discharge of the processed material may be effected through a discharge or exhaust port 76 located near the bottom of housing 60.

In the modification of FIG. 9, the numeral 80 denotes a drum-like elongated housing which is stationary, and within which is housed a cylindrical rotor 82. The ends of housing 80 may be closed by means of heads or end walls 84 and 86, through which are extended the drive shaft 88. The rotor may be keyed or otherwise fixed concentrically upon shaft 88, so that motor 90 may drive the rotor at high speed within the housing.

The outer cylindrical surface of rotor 82 may be provided with spaced parallel ribs 92 extending lengthwise of the rotor, substantially in accordance with FIGS. 1 to 6, and in like manner the inner cylindrical surface of housing 80 may be provided with similar spaced ribs 94. Ribs 92 and 94 perform in the manner of ribs 40 and 44, FIGS. 1 to 6, to defiber any particles or clumps in the slurry fed thereto.

In the FIG. 9 construction, the end wall 96 of rotor 82 has fixed thereto a succession of concentric discs 98, 100, 102, of diminishing diametral dimensions, and each of said discs carries on its periphery a succession of spaced ribs 104 directed transversely thereof. In addition to the peripheral ribs 104, the discs carry radial spaced ribs 106 which communicate with the peripheral ribs 104 to convey slurry outwardly of the rotor for entry between the ribbed and channeled cylindrical surfaces of rotor 82 and housing 80. The discs may be keyed at 107 to shaft 88, if desired.

In cooperative relationship to rotor discs 98, 100, 102, is a series of stationary rings 110, 112, 114, which surround respectively the discs 98, 100, 102, with clearance provided whereby the discs may rotate within the confines of the rings. Each ring has a central bore provided with a series of spaced transverse ribs 116, and a series of spaced radial ribs 118 in communication therewith, to direct slurry radially outwardly from shaft 88 in cooperation with the centrifuging action of rotor discs 98, 100, 102. As will be understood, slurry to be processed is pumped toward the rings and discs through a feed port 120 and manifold 122, to enter housing 80 through an entry port 124 in the end wall 84 of the housing. A cone 126 fixed upon shaft 88 may serve to initiate outward distribution of slurry to the rings and discs, said cone being preferably surrounded by a centrally apertured stationary ring 128 fixed to housing end wall 84. An exhaust port 130 at the opposite end of the housing releases the processed slurry and separated fibers.

It should be understood that the rotor discs move within their respective cooperating rings at high speed and with clearance ranging between .010 and .030 inch. The same clearance range is provided between the ribs 92 and 94 of the rotor and its surrounding housing, where the surface speed exceeds 100 feet per second. The ribs 92 and 94 and their intervening channels may terminate at points such as 132 within the discharge end limit of the rotor, to diminish the rate of passage of processed slurry toward discharge port 130 while augmenting the defibering action. However, under some conditions of contemplated usage, the channels between ribs 92 and 94 may be extended beyond the points 132 so as to permit greater freedom of slurry movement along the length of the rotor.

By interposing small dams in the channels of either the rotor or the stator, or both, the slurry may be caused to shift back and forth between intercepting surfaces to some extent, for augmenting the defibering and size-reducing action upon any fiber, clumps, and undefibered pieces carried by the slurry.

The device of the invention successfully defibers many types of papers which heretofore were considered unsuited for reclamation of fibers, and were therefore disposed of as absolute waste. Such papers when processed in accordance with the present invention, yield great quantities of high grade fibers economically and without difficulty.

It is to be understood that various modifications and changes may be made in the structural details of the improved refiner, within the scope of the appended claims, without departing from the spirit of the invention.

What is claimed is:

1. A refiner for slurry containing fiber clumps, undefibered pieces, and contaminants which are water-insoluble, said refiner comprising a hollow stationary housing including ports for the feeding and exhaust of slurry, a plurality of discs within the housing each having a working surface, said surfaces being disposed in spaced parallelism, alternate radial ribs and channels in the working surfaces of the discs, and means for relatively rotating said discs at high speed, means associated with the feeding port for introducing slurry centrally of one disc and between the discs, whereby the slurry is moved by centrifugal force toward and beyond the peripheries of the discs, the space between the discs and the speed of disc rotation being so coordinated with the depth and width of the ribs and channels, as to impose violent hydraulic shear and shock upon the slurry between the discs, for defibering the clumps and undefibered pieces without substantially reducing the size of flexible piece contaminants included in the slurry, a drum-like rotor rotatable with one of the discs, said rotor having an outer cylindrical surface alternately ribbed and channeled lengthwise of the rotor, and wherein the housing includes an inner cylindrical working surface alternately ribbed and channeled in substantial parallelism with the ribs and channels of the rotor, the rotor being mounted upon the housing to dispose the ribs of the rotor in close proximity to the ribs of the housing, for defibering the constituents of the slurry by violent hydraulic shear and shock forces imposed upon the constituents passing between the aforesaid surfaces of the rotor and the housing, the channels of the rotor being in fluid communicating relationship with the channels of the discs.

2. In a refiner of the character described, the combination of a plural disc refining member and a drum-like rotor refining member coaxially mounted on a common shaft for simultaneous rotation in a housing, said rotor having an outer cylindrical surface alternately ribbed and channeled lengthwise of the rotor and wherein the housing includes an inner cylindrical working surface alternately ribbed and channeled in substantial parallelism with the ribs and channels of the rotor, the rotor being mounted upon the housing to dispose the ribs of the rotor in close proximity to the ribs of the housing, for defibering the constituents of the slurry by violent hydraulic shear and shock forces imposed upon the constituents passing between the aforesaid surfaces of the rotor and the housing, said plural disc refining member comprising a plurality of discs having cooperating working surfaces, said surfaces being disposed in spaced parallelism, alternate radial ribs and channels in the working surfaces of the discs, and means for relatively rotating said discs at high speed, means associated with the feeding port for introducing slurry centrally of one disc and between the discs, whereby the slurry is moved by centrifugal force toward and beyond the peripheries of the discs, and means joining, in fluid flow communication, the channels of the discs with the channels of the rotor.

3. A refiner for slurry containing fiber clumps, undefibered pieces, and contaminants which are water-insoluble, said refiner comprising a hollow stationary housing including ports for the feeding and exhaust of slurry, a drum-like rotor rotatable in said housing, said rotor having an outer cylindrical surface alternately ribbed and channeled lengthwise of the rotor, and wherein the housing includes an inner cylindrical working surface alternately ribbed and channeled in substantial parallelism with the ribs and channels of the rotor, the rotor being mounted upon the housing to dispose the ribs of the rotor in close proximity to the ribs of the housing, for defibering the constituents of the slurry by violet hydraulic shear and shock forces imposed upon the constituents passing between the aforesaid surfaces of the rotor and the housing, a plurality of discs secured to the end of the rotor adjacent the feeding port, said discs being arranged in a succession of concentric discs of diminishing diametrical dimensions, and each of said discs having a working surface of alternate radial ribs and channels, a series of stationary rings surrounding said discs, said rings having a working surface of alternate channels and ribs cooperating with said ribs and channels of said discs to direct the slurry outwardly, means associated with the feeding port for introducing slurry centrally of one disc and between the discs and means joining, in fluid communicating relationship, the channels of the discs and the channels of the rotor.

References Cited
UNITED STATES PATENTS

| | | | |
|---|---|---|---|
| 1,807,773 | 6/1931 | Dawson | 241—260 |
| 2,035,994 | 3/1936 | Sutherland | 241—21 |
| 2,190,922 | 2/1940 | Heath et al. | 241—21 X |
| 2,697,966 | 12/1954 | Hyman | 241—260 |
| 3,240,437 | 3/1966 | Horstman | 241—255 X |

ANDREW R. JUHASZ, *Primary Examiner.*